US009684614B2

(12) United States Patent
Shanmugam

(10) Patent No.: US 9,684,614 B2
(45) Date of Patent: Jun. 20, 2017

(54) SYSTEM AND METHOD TO CONVERT LOCK-FREE ALGORITHMS TO WAIT-FREE USING A HARDWARE ACCELERATOR

(71) Applicant: Signalchip Innovations Private Limited, Bangalore (IN)

(72) Inventor: Kandasamy Shanmugam, Bangalore (IN)

( * ) Notice: Subject to any disclaimer, the term of this patent is extended or adjusted under 35 U.S.C. 154(b) by 223 days.

(21) Appl. No.: 14/605,907

(22) Filed: Jan. 26, 2015

(65) Prior Publication Data
US 2015/0212934 A1     Jul. 30, 2015

(30) Foreign Application Priority Data

Jan. 27, 2014    (IN) .............................. 348/CHE/2014

(51) Int. Cl.
*G06F 12/00* (2006.01)
*G06F 13/24* (2006.01)
*G06F 9/46* (2006.01)
*G06F 12/02* (2006.01)

(52) U.S. Cl.
CPC ............... *G06F 13/24* (2013.01); *G06F 9/46* (2013.01); *G06F 12/023* (2013.01); *G06F 2212/251* (2013.01)

(58) Field of Classification Search
CPC .... G06F 13/24; G06F 9/46; G06F 2209/5018; G06F 13/1684; G06F 11/073; G06F 11/079; G06F 12/023; G06F 2212/251
See application file for complete search history.

(56) References Cited

U.S. PATENT DOCUMENTS

| 7,533,221 | B1* | 5/2009 | Doherty | G06F 9/526 711/147 |
| 9,329,988 | B2* | 5/2016 | Jones | G06F 12/023 |
| 2003/0105946 | A1* | 6/2003 | Cornaby | G06F 9/30101 712/245 |

(Continued)

OTHER PUBLICATIONS

Cong, Guojing, and David Bader. "Lock-free parallel algorithms: An experimental study." International Conference on High-Performance Computing. Springer Berlin Heidelberg, 2004.*

(Continued)

*Primary Examiner* — David X Yi
*Assistant Examiner* — Francisco Grullon
(74) *Attorney, Agent, or Firm* — The Law Office of Austin Bonderer, PC; Austin Bonderer

(57) ABSTRACT

A method to convert lock-free algorithm to wait-free using a hardware accelerator includes (i) executing a plurality of software threads by a plurality of processing units associated, the plurality of software threads is associated with at least one operation, (ii) generating at least one of a read request or a write request at the hardware accelerator based on the execution, (iii) generating at least one operation includes PARAM and read request or the write request at the hardware accelerator, (iv) checking, an operation specific condition of at least one software thread of the plurality of software threads, and (v) updating, at least one read value or write value and at least one state variable upon the operation specific condition being an operation success. The operation specific condition includes an operation success or an operation failure based on the PARAM, the read request, or the write request.

22 Claims, 8 Drawing Sheets

(56) References Cited

U.S. PATENT DOCUMENTS

| | | | | |
|---|---|---|---|---|
| 2005/0216691 A1* | 9/2005 | Michael | ............... | G06F 12/023 |
| | | | | 711/170 |
| 2006/0173885 A1* | 8/2006 | Moir | ...................... | G06F 9/466 |
| 2010/0257534 A1* | 10/2010 | Cismas | ................ | G06F 9/3851 |
| | | | | 718/103 |
| 2011/0099335 A1* | 4/2011 | Scott | .................. | G06F 12/0842 |
| | | | | 711/141 |
| 2012/0284645 A1* | 11/2012 | Sitrick | ................ | G06Q 10/101 |
| | | | | 715/753 |
| 2013/0046951 A1* | 2/2013 | Jones | ................... | G06F 12/023 |
| | | | | 711/171 |
| 2014/0089539 A1* | 3/2014 | Hudzia | .................... | G06F 9/52 |
| | | | | 710/52 |
| 2016/0119388 A1* | 4/2016 | Sitrick | ................. | H04L 65/403 |
| | | | | 715/753 |

OTHER PUBLICATIONS

Ismail, Aws, and Lesley Shannon. "FUSE: Front-end user framework for O/S abstraction of hardware accelerators." Field-Programmable Custom Computing Machines (FCCM), 2011 IEEE 19th Annual International Symposium on. IEEE, 2011.*

Pooja Aggarwal, Smruti R. Sarangi, "Lock-Free and Wait-Free Slot Scheduling Algorithms", Parallel and Distributed Processing Symposium, International, vol. 00, No. , pp. 961-972, 2013.*

\* cited by examiner

| DEVICE ADDRESS MSB 204A | OPn 204B | PARAM 204C |
|---|---|---|
| 0X44 (8 BITS) | 4 BITS | 20 BITS |

SYSTEM AND METHOD TO CONVERT LOCK-FREE ALGORITHMS TO WAIT-FREE USING A HARDWARE ACCELERATOR

CROSS-REFERENCE TO RELATED APPLICATIONS

This application claims priority to Indian patent application no. 348/CHE/2014 filed on Jan. 27, 2014, the complete disclosure of which, in its entirely, is herein incorporated by reference.

BACKGROUND

Technical Field

The embodiments herein generally relate to hardware accelerators and, more particularly, to a system and a method to convert lock-free algorithms to wait-free algorithms using hardware accelerators.

Description of the Related Art

Multithreading is a process of executing multiple software threads simultaneously and is indicative of an ability of a program or an operating system process to manage its use by more than one user at a time and to also manage multiple requests by the same user without the need of causing multiple copies of the software program to run in the computer. Typically, central processing units (CPUs) have hardware support to efficiently execute multiple software threads simultaneously. However, CPUs enabled with the multithreading capabilities are distinguished from multiprocessing systems (such as, multi-core systems) in requiring sharing of one or more resources of a single core including computing units, a CPU cache and a translation look aside buffer (TLB) for enabling simultaneous execution of multiple software threads. Most of multiprocessing systems use a variety of techniques to ensure integrity of shared data, the techniques including for example, locking mechanisms, software (SW) based lock-free algorithms, hardware (HW) assisted lock free algorithms, transactional memory, and the like. The typical sequence for implementing the lock-free algorithm includes reading a value from a store, performing a set of operations with computation and performing condition checks involving read/write value (VALUE), a parameter and/or state variables (STATE) in the store. If the operation succeeds, then VALUE and STATE is updated in the store and VALUE is returned else the request fails.

Apart from the operation specific condition check failing, failure can also happen due to atomicity being violated i.e. multiple threads try to execute the above sequence with at least one of the steps overlapping in time. The atomicity violation problem also leads to one attempt succeeding and all other subsequent attempts failing. When there is a failure due to atomicity violation, an application thread is expected to retry the operation (OPn) and hence the operation is not "wait-free". Depending on a prioritization, design and state of the system, multiple attempts have to be made before an attempt succeeds. The above approach makes timing requirement of the system unpredictable and therefore the approach may not be suitable for use in systems requiring deterministic behavior. Detection of atomicity violation is often performed using value of a location. For example if a thread read 'A' as the value from the location and need to update it to 'N' it may issue an atomic Compare and Swap (CAS) instruction which can update the 'location' to 'N' if still holds 'A' but fails if the location contains any other value (due to another thread updating the value). But checking that the location still has 'A' does not mean it has not been updated, the location could have been changed from 'A' to say 'B' and then back to 'A' by one or more other threads. This scenario is termed the 'ABA' hazard which leads to incorrect results. Typical implementations of lock-free algorithms suffer from this.

Eliminating hazards like the ABA problem further complicate implementation requiring additional overhead with Compare and Swap (CAS) and extremely conservative approach with LL/SC (Load Link/Store Conditional) in determining atomicity violation (mostly due to the higher cost of accurate determination), leading to atomicity failures even in cases where it would have been safe for the operation to succeed. The wait-free algorithms can be created for certain structures, but their performance is worse than lock-free or even lock-based approaches. In some cases they also require memory proportional to the number of application threads. Accordingly, there remains a need for an efficient system to reduce the problem of atomicity, the ABA hazard that facilitates ensuring integrity of shared data.

SUMMARY

In view of the foregoing, an embodiment herein provides a method of converting a lock-free algorithm to wait-free algorithm with the hardware accelerator. The method include (i) executing a plurality of software threads by a plurality of processing units associated, the plurality of software threads is associated with at least one operation, (ii) generating at least one of read request or write request at the hardware accelerator based on the execution, (iii) generating at least one operation include PARAM and read request or write request at the hardware accelerator, (iv) checking, an operation specific condition of at least one software thread of the plurality of software threads, and (v) updating, at least one of read value or write value and at least one state variable upon the operation specific condition being an operation success. The plurality of processing units being communicatively associated with the hardware accelerator. The one or more operation is one of the read request or the write request. The hardware accelerator is associated with a plurality of buses. The hardware accelerator is accessible to the plurality of software threads associated with the plurality of processing units as a memory mapped device mapped into a pre-determined physical address range of each of the plurality of buses for ensuring contention resolution among the plurality of buses. The operation specific condition includes an operation success or an operation failure based on at least one of the PARAM, the read request, or the write request.

The method may further include performing prior to checking the operation specific conditions (i) the one or more operations, and the device address associated with the read request is encoded to obtain an encoded data, and (ii) at least one of a failure value or a success value of the one or more operations is returned from the hardware accelerator to the plurality of software threads on a plurality of data lines associated with the pre-determined physical address range. The encoded data is communicated to the hardware accelerator by the plurality of software threads executed by the plurality of processing units. The lock free algorithm is partitioned into the software and the hardware. The encoded data is passed from the software to the hardware and obtaining return encoded data from the hardware.

The method may further include performing prior to checking the operation specific conditions, the one or more operation, the PARAM, the device address, and plurality of data lines associated with the write request is encoded to obtain an encoded data. The encoded data is communicated to the hardware accelerator by the plurality of software threads executed by the plurality of processing units. The lock-free algorithm is partitioned into the software and the hardware. The encoded data is passed from the software to the hardware. In one embodiment, a contention within each of the plurality of buses is resolved through one of an arbitration protocol and a starvation free priority resolution technique.

The one or more operation and the PARAM may be encoded as a least significant bit of the encoded data. The steps of checking operation specific condition and updating may be performed by the hardware accelerator. The steps of encoding and returning may be performed by the hardware accelerator. The pre-determined physical address range associated with each of the plurality of buses may be associated with at least one processing unit of the plurality of processing units. The method may further include the one or more operation, the device address and a memory address location of the PARAM may be encoded for generating the encoded data, upon size of the PARAM exceeding a pre-allocated number of bits for the PARAM in the encoded data.

The memory address location may correspond to a pre-allocated memory for the PARAM. The pre-allocated memory may be allocated proportional to a number of concurrent requests during execution of the plurality of software threads by the hardware accelerator at any predetermined instance of time. The method may further include at least one of (a) masking at least one interrupt on a processing unit from among the plurality of processing units being accessed by the hardware accelerator, (b) writing into the pre-allocated memory for the PARAM reserved for the processing unit, (c) performing a read or write operation to the hardware accelerator and passing the pre-allocated memory as PARAM for the encoding and (d) unmasking the masked interrupt. The method may further include allocating the pre-allocated memory for the PARAM based on a circular queue which includes at least one of (i) reading a dedicated hardware accelerator to obtain a pre-allocated memory for the PARAM, (ii) writing into the pre-allocated memory for the PARAM reserved for the processing unit, (iii) performing, a read or write operation to the dedicated hardware accelerator and passing the pre-allocated memory as PARAM, and writing the pre-allocated memory into the dedicated hardware accelerator to release the pre-allocated memory. The dedicated hardware accelerator may be dedicated for PARAM memory allocation.

In one aspect, a hardware accelerator includes a dedicated digital logical circuit and memory storing at least one VALUE and at least one STATE is provided. The dedicated digital logical circuit is configured to (i) process at least one of the read request or write request at the hardware accelerator upon execution of a plurality of software threads by a plurality of processing units associated, the plurality of software threads is associated with at least one operation, (ii) process at least one operation include PARAM and read request or write request at the hardware accelerator, (iii) check an operation specific condition of at least one software thread of the plurality of software threads, and (iv) update at least one of: at least one read VALUE or write VALUE and at least one STATE variable upon the operation specific condition being an operation success. The operation specific condition includes an operation success or an operation failure based on at least one of the PARAM, the read request, or the write request. The hardware accelerator is associated with a plurality of buses. The hardware accelerator is accessible to the plurality of software threads associated with the plurality of processing units as a memory mapped device mapped into a pre-determined physical address range of each of the plurality of buses for ensuring contention resolution among the plurality of buses.

The hardware accelerator may be further configure to, perform prior to checking the operation specific conditions (i) decode the at least one of operation, and the device address associated with the read request to obtain an encoded data, and return at least one of a failure value or a success value of the at least one operation from the hardware accelerator to the plurality of software threads on a plurality of data lines associated with the pre-determined physical address range. The lock free algorithm may be partitioned into the software and the hardware. The encoded data may be passed from the software to the hardware and obtaining return encoded data from the hardware. The encoded data may be communicated to the hardware accelerator by the plurality of software threads executed by the plurality of processing units. The hardware accelerator may be further configured to, perform prior to checking the operation specific conditions (i) decode the at least one of operation, the PARAM, the device address, and plurality of data lines associated with the write request to obtain an encoded data. The encoded data may be communicated to the hardware accelerator by the plurality of software threads executed by the plurality of processing units. The lock-free algorithm may be partitioned into the software and the hardware. The decoded data may be passed from the software to the hardware. A contention within each of the plurality of buses may be resolved through one of an arbitration protocol and a starvation free priority resolution technique.

The one or more operation and the PARAM may be encoded as a least significant bit of the encoded data. The pre-determined physical address range associated with each of the plurality of buses may be associated with at least one processing unit of the plurality of processing units. The hardware accelerator may be further configured to, decode the at least one of operation, the device address and a memory address location of the PARAM for generating the encoded data, upon size of the PARAM exceeding a pre-allocated number of bits for the PARAM in the encoded data. The memory address location corresponds to a pre-allocated memory for the PARAM. The hardware accelerator may be further configured to upon receiving a read operation or write operation to the hardware accelerator passing the pre-allocated memory as PARAM for the encoding, performs a read operation for retrieving the pre-allocated memory and use its contents as PARAM for the requested operation. The hardware accelerator may be further configured to allocate the pre-allocated memory for the PARAM based on a circular queue include (i) read a dedicated hardware accelerator to allocate a pre-allocated memory for the PARAM, and write the pre-allocated memory into the dedicated hardware accelerator to release the pre-allocated memory. The dedicated hardware accelerator may be dedicated for PARAM memory allocation.

In another aspect, a hardware accelerator includes a processor and memory storing instructions to execute the processor is provided. The memory storing at least a VALUE and a STATE. The processor is configured to (i) process at least one of the read request or write request at the hardware accelerator upon execution of a plurality of software threads by a plurality of processing units associated, the plurality of software threads is associated with at least one operation, (ii) process at least one operation include PARAM and read request or write request at the hardware accelerator, (iii)

check an operation specific condition of at least one software thread of the plurality of software threads, and (iv) update at least one of: at least one read VALUE or write VALUE and at least one STATE variable upon the operation specific condition being an operation success. The hardware accelerator is associated with a plurality of buses. The hardware accelerator is accessible to the plurality of software threads associated with the plurality of processing units as a memory mapped device mapped into a pre-determined physical address range of each of the plurality of buses for ensuring contention resolution among the plurality of buses. The operation specific condition includes an operation success or an operation failure based on at least one of the PARAM, the read request, or the write request.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 2B is an exemplary view of encoding at least one operation (OPn), PARAM in the plurality of software threads (SW) and communicating to the hardware accelerator of FIG. 1 according to an embodiment herein;

DETAILED DESCRIPTION OF PREFERRED EMBODIMENTS

Figure 1:
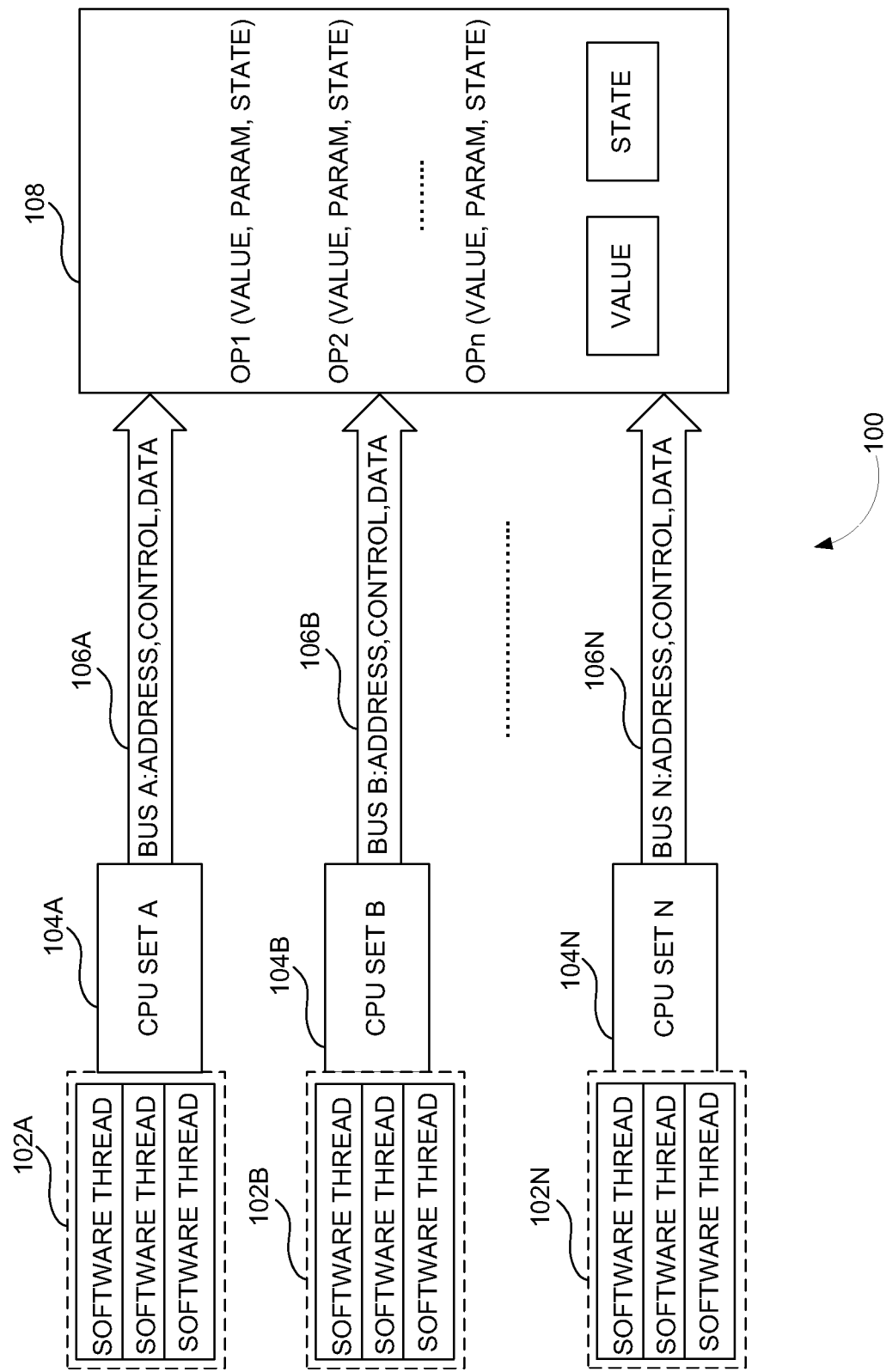
FIG. 1 is a system view illustrates a plurality of software thread (SW) within a plurality of processing units interfacing with a hardware accelerator to convert lock-free algorithms to wait-free algorithms according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Various embodiments of the methods and systems disclosed herein provide an efficient technique to reduce problem of atomicity and ABA hazard so as to ensure integrity of shared data by providing specific partitioning and interfacing between software and hardware designed to eliminate atomicity violations. In an embodiment, a method for converting lock-free algorithms to wait-free algorithms with a hardware accelerator is provided. The hardware accelerator stores read/write values (VALUE) and state variables (STATE) to perform a set of operation (OPn) required for a lock-free algorithm. In addition, the hardware accelerator performs one or more computations, condition checks and updates VALUE and STATE. In an embodiment, the hardware accelerator is accessible to the software (SW) as a memory mapped device, mapped into pre-determined physical address range of each bus. Referring now to the drawings, and more particularly to FIGS. 1 through 6, where similar reference characters denote corresponding features consistently throughout the figures, preferred embodiments are shown.

FIG. 1 is a system view illustrates a plurality of software threads (SW) 102A-N within plurality of processing units 104A-N interfacing with a hardware accelerator 108 to convert lock-free algorithms to wait-free algorithms according to an embodiment herein. The system view 100 includes the plurality of software threads (SW) 102A-N, the plurality of processing units 104A-N, and a plurality of buses 106A-N associated with the hardware accelerator 108. In one embodiment, the plurality of software threads (SW) 102A-N is executed by the plurality of processing units 104A-N (e.g., CPU set A 104A, CPU set B 104B, CPU set N 104N, as used herein the term "CPU set" is construed as referring to a plurality of processing units). The plurality of software threads (SW) 102A-N is associated with one or more operations. In one embodiment, the plurality of processing units 104A-N is communicatively associated with the hardware accelerator 108. In one embodiment, the one or more operations include, for example a read request or a write request.

The hardware accelerator 108 stores VALUE (e.g., read/write values) and/or STATE (e.g., state variables) and to perform a set of operations (OPn) required for a lock-free algorithm, including (i) computations, (ii) condition checks and (iii) updation of VALUE and STATE. The hardware accelerator 108 includes a dedicated digital logical circuit and memory storing at least one VALUE and at least one STATE. The hardware accelerator 108 is accessible to the one or more software threads (SW) 102A-N as a memory mapped device. The hardware accelerator 108 is mapped into a pre-determined physical address range of each of the one or more bus for ensuring contention resolution among the plurality of buses 106A-N. In one embodiment, each bus is associated with one or more CPUs and one or more software threads executing on any of at least one CPUs is able to interact with the hardware accelerator 108 by issuing a read/or write request. In one embodiment, the set of operations are for example, OP1 (VALUE, PARAM, STATE), OP2 (VALUE, PARAM, STATE), OPn (VALUE, PARAM, STATE). The hardware accelerator 108 generates one or more read request or write requests based on the execution. The hardware accelerator 108 generates the one or more operations including PARAM and read request or write request. In an embodiment, the hardware accelerator 108 checks an operation specific condition of at least one software thread of the plurality of software threads (SW) 102A-N. In one embodiment, the operation specific condition includes an operation success or an operation failure based on at least one of the PARAM, the read request, or the write request. The hardware accelerator 108 updates at least one read value, write value and/or at least one state variable upon the operation specific condition being an operation success.

Figure 2A:
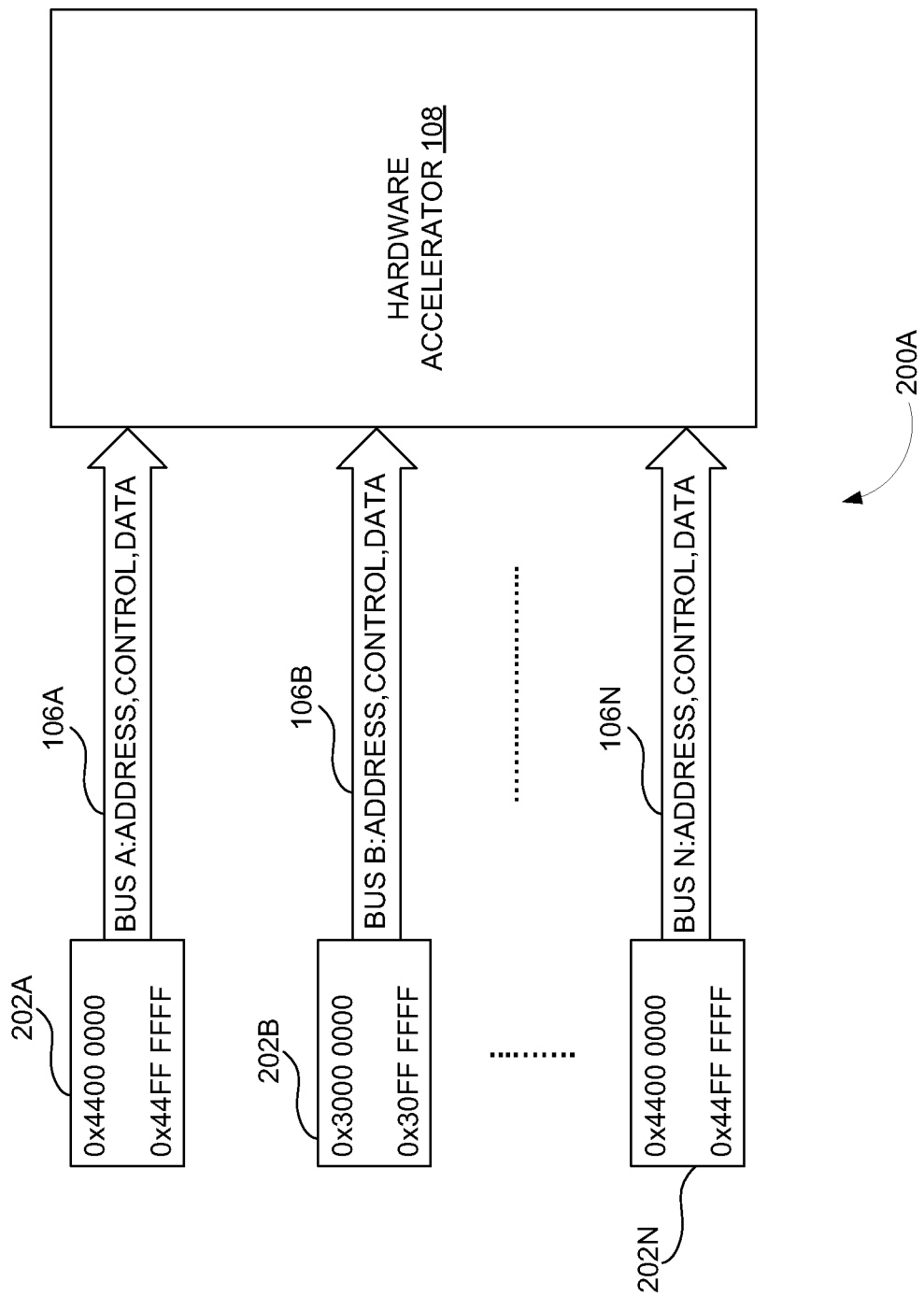
FIG. 2A is an exemplary view of address mapping of the hardware accelerator of FIG. 1 according to an embodiment herein.

FIG. 2A is an exemplary view 200A of an address mapping of the hardware accelerator 108 of FIG. 1 according to an embodiment herein. The exemplary view 200A includes a plurality of addresses 202A-N associated with the plurality of processing units 104A-N. In one embodiment, on each bus, the hardware accelerator 108 is addressable through a unique address range (unique to each bus). For example, on a 32 address bit bus, the hardware accelerator 108 is mapped to address range 0x4400 0000 to 0x44FF FFFF. Any read/write access request by a software (SW) running on a CPU set A 104A (which is connected to BUS A) to an address between 0x4400 0000 to 0x44FF FFFF (both inclusive) is routed to the hardware accelerator 108. The hardware accelerator 108 processes the request and responds as per a specific BUS protocol.

FIG. 2B is an exemplary view 200B of encoding at least one operation (OPn), PARAM in the plurality of software threads (SW) 102A-N and communicating to the hardware accelerator 108 of FIG. 1 according to an embodiment herein. The exemplary view 200B includes a device address MSB 204A, an at least one operation OPn 204B (VALUE, PARAM, and STATE), and a PARAM 204C. In one embodiment, the OPn, PARAM are encoded in the plurality of software thread (SW) 102A-N and communicated to the hardware accelerator 108 for partitioning a lock-free algorithm into software (SW) and hardware (HW). In one embodiment, an address range for the hardware accelerator 108 is selected to be large enough to encode and pass additional information (e.g., OPn and PARAM in the LSBs). For example, address mapping, 8 bits of the MSB are used for addressing, the remaining 24 bits available have been used as 4 bits for the OPn 204B and 20 bits for the PARAM 204C. If the operation OPn 204B returns with a result that is be mapped as a read request to the hardware accelerator 108. The result are returned on a data lines, otherwise it's mapped as a write request. In case of a write, the PARAM 204C may also be passed on the data lines in addition to an encoded field in the address. A specific FAILURE_VALUE may indicate failure or a specific bit in the result that encode success or failure status.

A specific BUS implementation may have arbitration/scheduling policy to serialize accesses of the hardware accelerator 108. For example, if a software thread (SW) on CPU1 and a software thread (SW) on CPU2, both connected to BUS1 which access the hardware accelerator 108. Then, the CPU1 may be serialized as first, CPU2 second or CPU2 first, CPU1 second as per BUS implementation. The hardware accelerator 108 may independently receive a request on each BUS, and if more than one request is received at the same time which leads to a contention. In one embodiment, the contention across the bus may be resolved by the hardware accelerator 108. The contention resolution may be performed based on any starvation free priority resolution methods. For example, the contention resolution method may be round robin, where the plurality of buses 106A-N are serviced in a fixed repeating sequence say A, B, . . . N and again A, B, . . . N and so on. For example, once a specific request is selected, the hardware accelerator 108 may perform the selected OPn 204B. The selected OPn 204B may return result and updates VALUE, STATE on success or indicating failure. The hardware accelerator 108 may then move on to process the next request, in one example embodiment.

In one embodiment, a memory extension is performed by using an additional memory, when encoding of the PARAM is not possible into one or more bits available in the address. The additional memory required may be in proportion with a maximum number of concurrent requests, which are required for executing multiple software threads. A request may be made on the hardware accelerator 108 at any time and may be less than a number of software threads in a system.

For example, before making a request the software thread first allocates PARAM_MEMORY_i, then writes the PARAM 204C into a memory reserved for PARAM_MEMORY_i (e.g. may be arbitrarily large) and then just passes 'i' to the hardware accelerator 108. When a request is selected for processing, the hardware accelerator 108 may first fetch the PARAM 204C from location associated with the PARAM_MEMORY_i and then processed. In one example embodiment, the PARAM_MEMORY allocation is designed to be "wait-free" and hence may be "wait-free" with the PARAM memory extension.

Figure 3A:
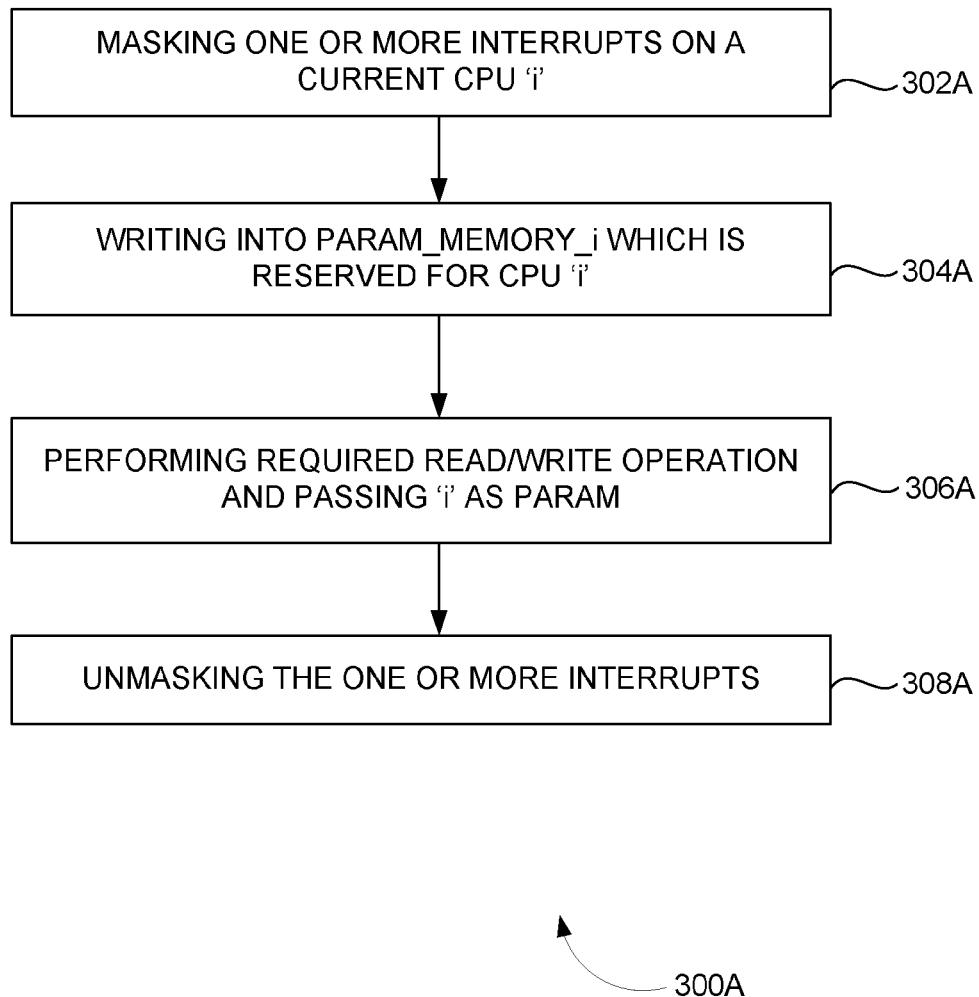
FIG. 3A is a flow diagram illustrating a method of allocating a PARAM_MEMORY within the plurality of processing units of FIG. 1 according to an embodiment herein.

FIG. 3A is a flow diagram 300A illustrating a method of allocating a PARAM_MEMORY within one or more processing units, such as the plurality of processing units 104A-N of FIG. 1 according to an embodiment herein. In step 302A, one or more interrupts are masked on a current CPU (e.g., in the CPU set A 104A also denoted as CPU 'i'). In step 304A, a write operation is performed into a PARAM_MEMORY_i (e.g., a pre-allocated memory) which is reserved for the CPU 'i'. In step 306A, a required read/write operation is performed. In step 308A, pass 'i' as the PARAM. In step 310A, one or more masked interrupts are unmasked. In one embodiment, masking of the interrupts for short duration of a bounded "Write" and "Read" operation may not affect the performance of a system.

In one embodiment, if a system already is upper bounded on a maximum number of concurrent requests which can be made at any time and if the bound is lesser than a number of CPUs then a dynamic PARAM_MEMORY allocation using a Circular Queue is implemented. The Circular Queue may be another "wait-free" Circular Queue implementation using another hardware accelerator (e.g., no PARAM is required for implementing a Circular Queue). Further, one or more hardware accelerators may be connected to directly free the PARAM_MEMORY allocation after PARAM read, in one embodiment.

Figure 3B:
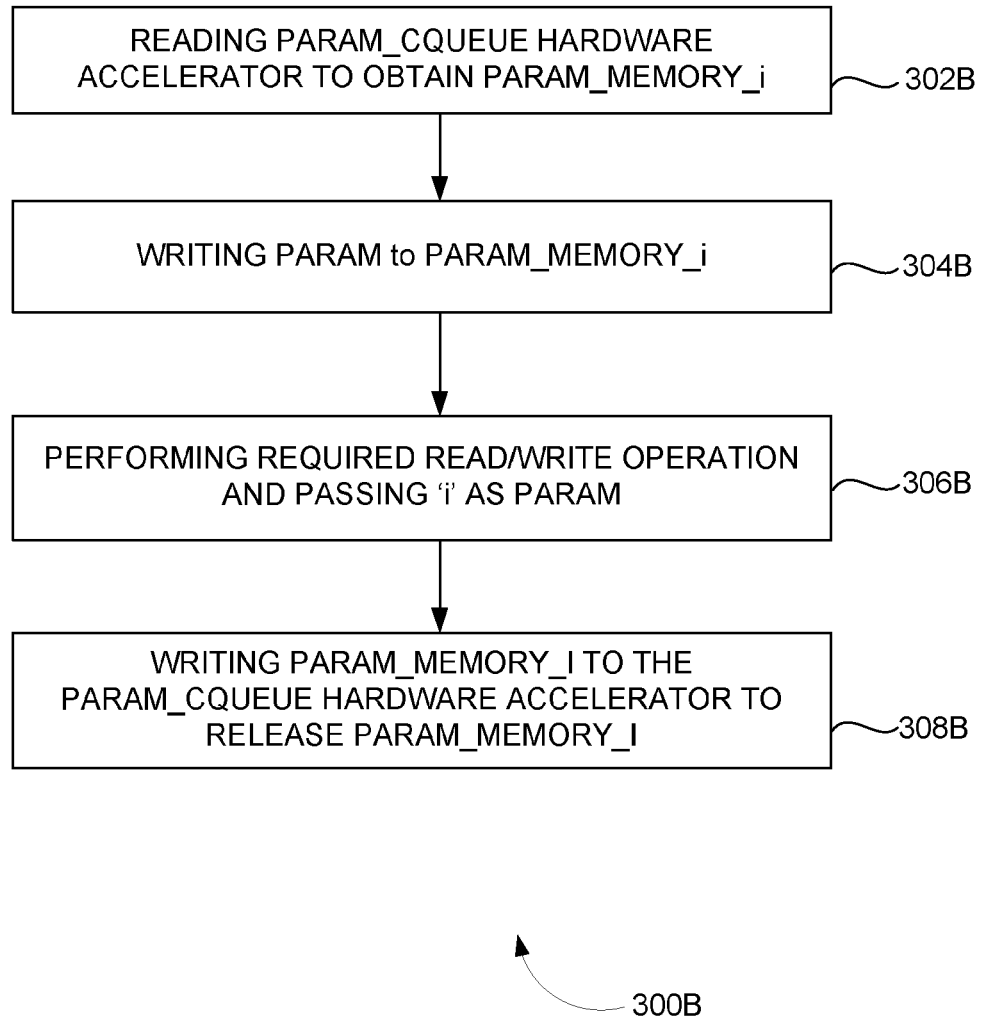
FIG. 3B is a flow diagram illustrating a method of allocating a PARAM_MEMORY using a circular queue according to an embodiment herein.

FIG. 3B is a flow diagram 300B illustrating a method of allocating a PARAM_MEMORY using a circular queue according to an embodiment herein. In step 302B, the PARAM_CQUEUE hardware accelerator (e.g., a dedicated hardware accelerator) is read to obtain a PARAM_MEMORY_i. In step 304B, the PARAM is written into a PARAM_MEMORY_i. In step 306B, a required read/write operation is performed. In step 308B, pass 'i' as a PARAM. The PARAM_MEMORY_i is unbound after PARAM read based on Writing 'i' to PARAM_CQUEUE HW accelerator.

In one embodiment, a "wait-free" circular buffer can be implemented. The hardware accelerator 108 is initialized and SIZE of a circular buffer is fixed. In one example embodiment, when the software thread wants to allocate space for writing, then the software thread may use OP0=write_start with PARAM=length of buffer to be allocated. The operation is mapped as a read to the hardware accelerator 108. The operation "Result" is returned as the read value. When the operation succeeds, "Result" may be between 0 to SIZE-1 and the location between Result to (Result+length) modulo SIZE may be written. Similarly, when the operation fails (due to lack of space), "Result" may be "SIZE".

In another example embodiment, when an software thread finishes writing to the allocated space and wants to indicate write completion then may use OP1=write_done with PARAM=(Result, Length) returned by corresponding successful write_start. Then the operation is mapped as a write to the hardware accelerator 108 (e.g., no return value for this operation).

In yet another example embodiment, when a software thread wants to read from circular buffer then may use OP2=read_start with PARAM=length of buffer required to read. The operation is mapped as a read to the hardware accelerator. The operation "Result" is returned as the read value. When the operation succeeds, "Result" may be between 0 to SIZE-1 and the location between "Result" to (Result+length) modulo SIZE may be read. Similarly, when the operation fails (not enough items to read), "Result" may be "SIZE". In yet another example embodiment, when an software thread may finish reading and wants to indicate read completion then may use OP3=read_done, with PARAM=(Result, Length) returned by corresponding successful read_start. The operation is mapped as a write to the hardware accelerator (no return value for this operation).

Figure 4:
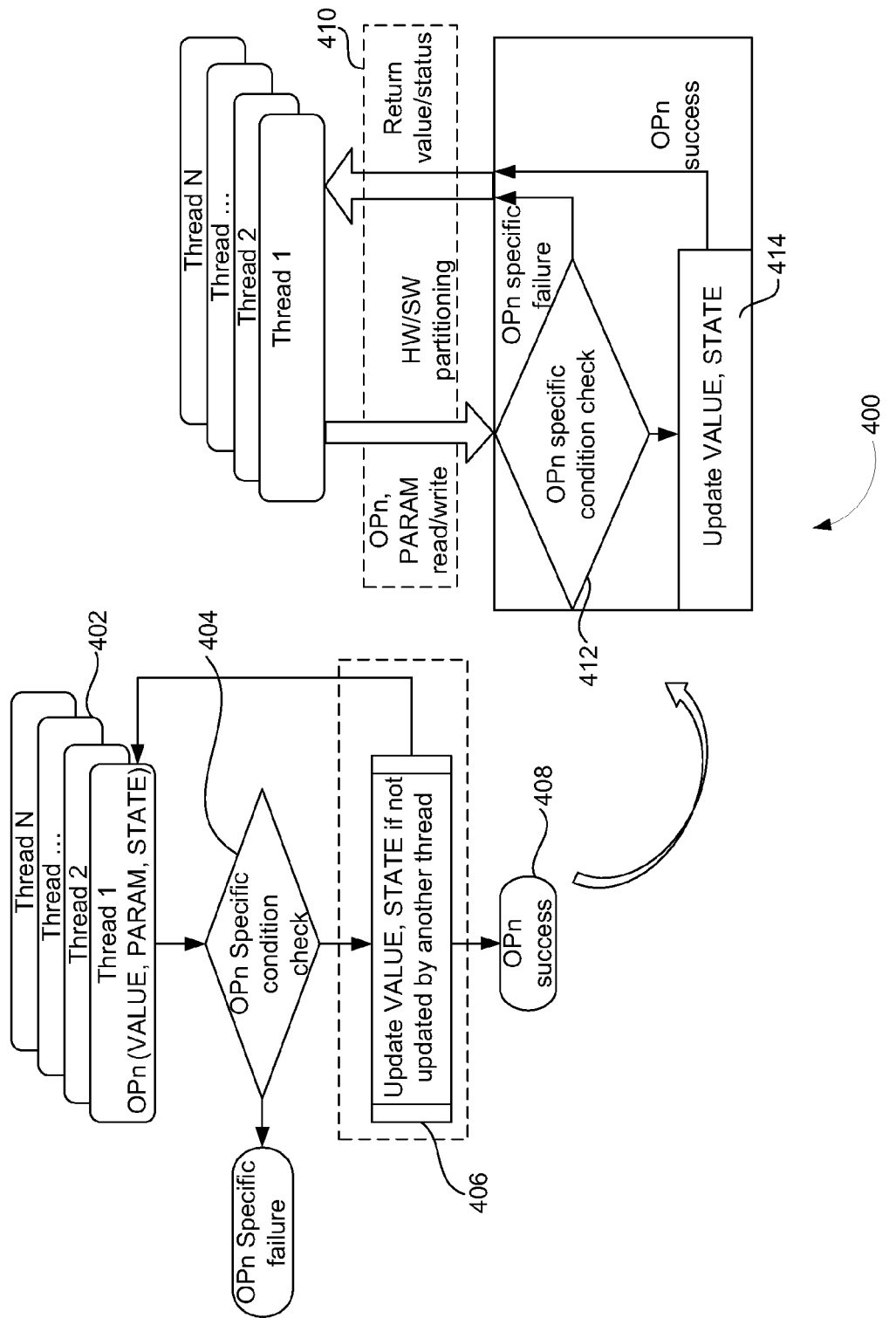
FIG. 4 is a flow diagram illustrating a method of converting a lock-free algorithms to wait-free algorithm with the hardware accelerator according to an embodiment herein.

FIG. 4 is a flow diagram 400 illustrating a method of converting lock-free algorithms to wait-free algorithm with the hardware accelerator 108 according to an embodiment herein. In step 402, the plurality of software threads 102A-N associated with OPn (VALUE, PARAM, and STATE) is obtained as an input. In step 404, check for operation (OPn) specific condition (e.g., OPn success or OPn specific failure) is performed. In step 406, update VALUE, STATE if not updated by another software thread which indicates status as "OPn success" else indicates status as "OPn failure" and return to the step 402. In one embodiment, the updation of VALUE, STATE is performed at a central processing unit (CPU)/hardware (HW) assisted (e.g. CAS, LL/SC). In step 408, the operation status is indicated as "OPn success". In step 410, enables partitioning of hardware and software. In one embodiment, an OPn, PARAM read/write is inputted to the hardware accelerator 108. In step 412, check for OPn specific condition (e.g., OPn success or OPn specific failure) is performed. In step 414, update VALUE, STATE and indicate status as "OPn success" else indicates status as "OPn failure" and return value/status to the software thread 102A-N. In one embodiment, a lock-free algorithm is mapped into steps 402 to 408 and then steps 410 to 414 that indicate the lock-free algorithm is converted to wait-free algorithm with the hardware accelerator 108.

The embodiments herein can take the form of, an entirely hardware embodiment which includes a dedicated digital logical circuit, an entirely software embodiment or an embodiment including both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, remote controls, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 5:
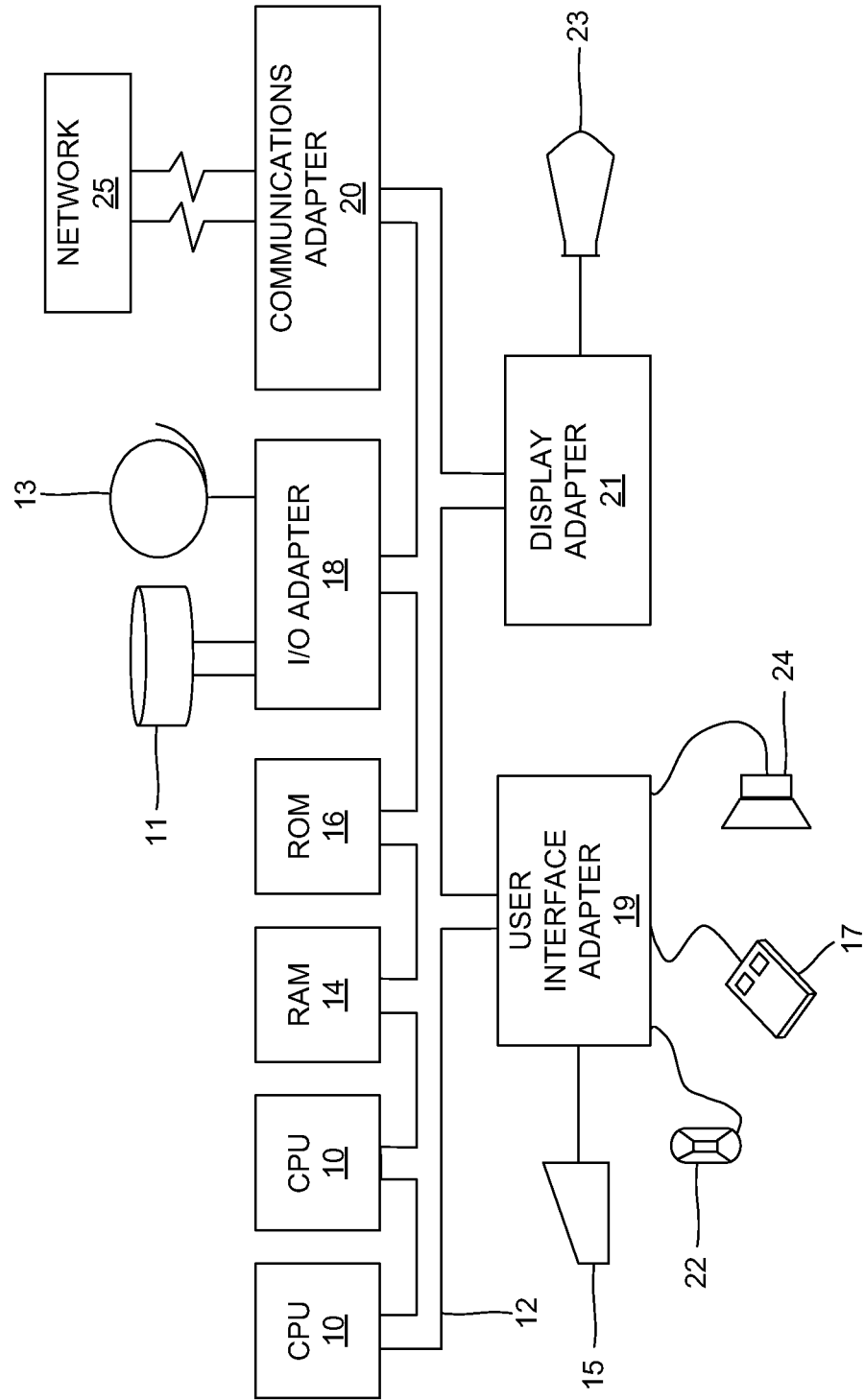
FIG. 5 illustrates a schematic diagram of computer architecture according to an embodiment herein.

A representative hardware environment for practicing the embodiments herein is depicted in FIG. 5. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a user interface adapter 19 that connects a keyboard 15, mouse 17, speaker 24, microphone 22, and/or other user interface devices such as a touch screen device (not shown) or a remote control to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Figure 6:
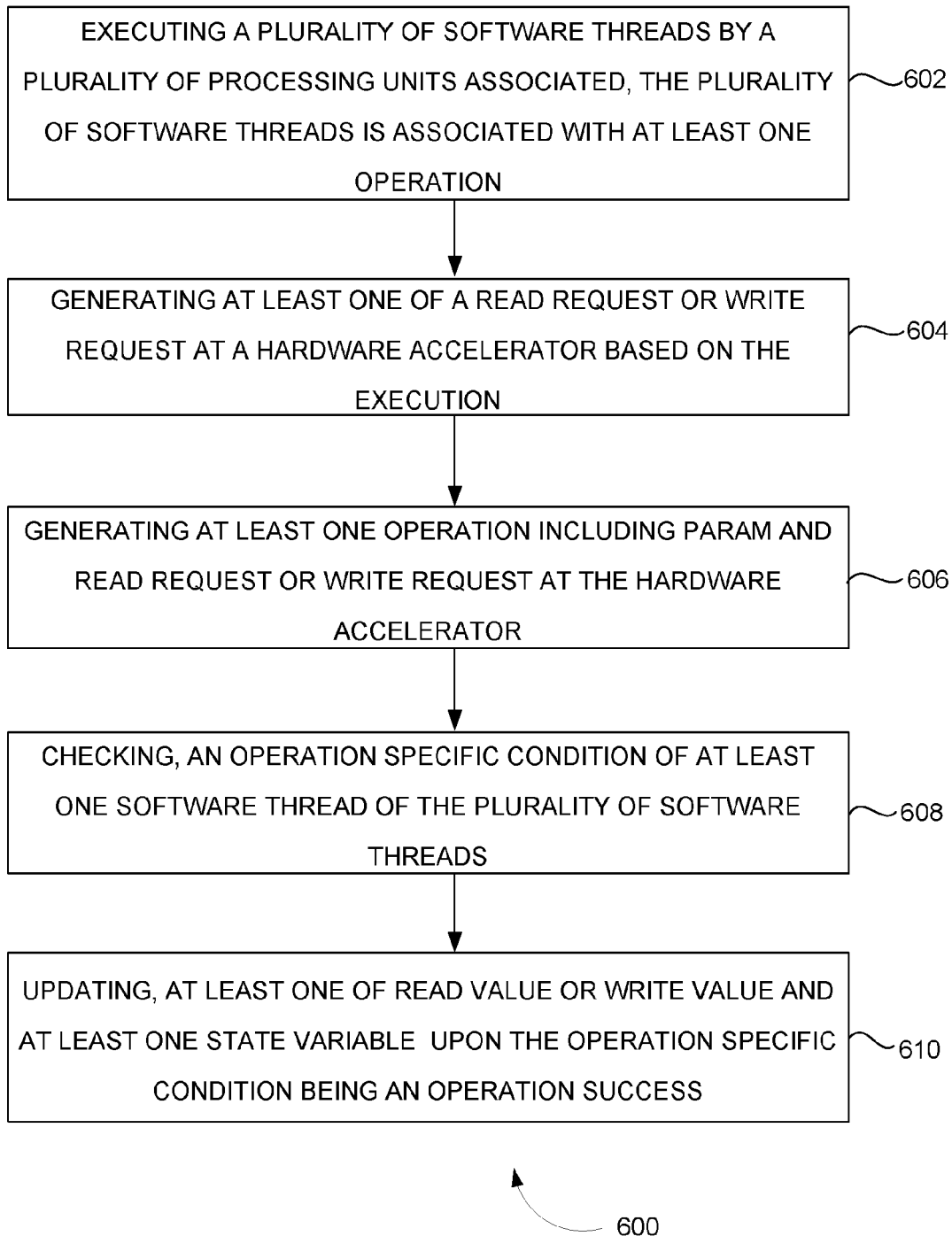
FIG. 6 is a flow diagram illustrating wait-free algorithm operations with the hardware accelerator according to an embodiment herein.

FIG. 6 is a flow diagram 600 illustrating a method of wait-free algorithm operations with the hardware accelerator 108 according to an embodiment herein. In step 602, a plurality of software threads 102A-N is executed by a plurality of processing units 104A-N associated and the plurality of software threads 102A-N is associated with at least one operation. In step 604, at least one of read request or write request is generated at the hardware accelerator 108 based on the execution. In step 606, at least one operation is generated includes PARAM and read request or write request at the hardware accelerator 108. In step 608, an operation specific condition of at least one software thread of the plurality of software threads 102A-N is checked. In step 610, at least one of read VALUE or write VALUE and at least one STATE variable is updated upon the operation specific condition being an operation success.

The plurality of processing units 104A-N is communicatively associated with the hardware accelerator 108. The one or more operation is one of a read request or a write request. The hardware accelerator 108 is associated with a plurality of buses 106A-N. The hardware accelerator 108 is accessible to the plurality of software threads 102A-N associated with the plurality of processing units 104A-N as a memory mapped device mapped into a pre-determined physical address range of each of the plurality of buses for ensuring contention resolution among the plurality of buses 106A-N. The operation specific condition include an operation success or an operation failure based on at least one of the PARAM, the read request, or the write request.

The method may further include performing prior to checking the operation specific conditions (i) the one or more operations, and the device address associated with the read request is encoded to obtain an encoded data, and (ii) at least one of a failure value or a success value of the one or more operations is returned from the hardware accelerator 108 to the plurality of software threads 102A-N on a plurality of data lines associated with the pre-determined physical address range. The encoded data may be communicated to the hardware accelerator 108 by the plurality of software threads 102A-N executed by the plurality of processing units 104A-N. In one embodiment, the lock free algorithm is partitioned into the software and the hardware. The encoded data is passed from the software to the hardware and obtaining return encoded data from the hardware.

The method further include performing prior to checking the operation specific conditions, the one or more operation, the PARAM, the device address, and plurality of data lines associated with the write request is encoded to obtain an encoded data. The encoded data is communicated to the hardware accelerator 108 by the plurality of software threads 102A-N executed by the plurality of processing units 104A-N. The lock-free algorithm is partitioned into the software and the hardware. The encoded data is passed from the software to the hardware. In one embodiment, a contention within each of the plurality of buses 106A-N is resolved through one of an arbitration protocol and a starvation free priority resolution technique.

The one or more operation and the PARAM may be encoded as a least significant bit of the encoded data. In one embodiment, the steps of check operation specific condition and update are performed by the hardware accelerator 108. In one embodiment, steps of encoding and returning are performed by the hardware accelerator 108. In one embodiment, the pre-determined physical address range associated with each of the plurality of buses 106A-N is associated with at least one processing unit of the plurality of processing units 104A-N. The method may further include the one or more operation, the device address and a memory address location of the PARAM is encoded for generating the encoded data, upon size of the PARAM exceeding a pre-allocated number of bits for the PARAM in the encoded data.

The memory address location corresponds to a pre-allocated memory for the PARAM. In one embodiment, the pre-allocated memory is allocated proportional to a number of concurrent requests during execution of the plurality of software threads by the hardware accelerator 108 at any predetermined instance of time. The method may further include at least one of (a) masking at least one interrupt on a processing unit from among the plurality of processing units 104A-N being accessed by the hardware accelerator 108, (b) writing into the pre-allocated memory for the PARAM reserved for the processing unit, (c) performing a read or write operation to the hardware accelerator 108 and passing the pre-allocated memory as PARAM for the encoding, and (d) unmasking the masked interrupt.

The method may further include allocating the pre-allocated memory for the PARAM based on a circular queue which includes at least one of (i) reading a dedicated hardware accelerator 108 to obtain a pre-allocated memory for the PARAM, (ii) writing into the pre-allocated memory for the PARAM reserved for the processing unit, (iii) performing, a read or write operation to the hardware accelerator 108 and passing the pre-allocated memory as PARAM, and writing the pre-allocated memory into the dedicated hardware accelerator to release the pre-allocated memory. The dedicated hardware accelerator may be dedicated for PARAM memory allocation.

There are no failures due to atomicity violation as the hardware accelerator 108 is built to process request one by one. There is a fixed upper bound on a time limit, which may be independent of a number of software threads in one example embodiment. The time limit is based on the contention resolution method. For example, with a round robin scheme the time limit may be "Operation time" X "number of CPUs". The memory used may be independent of the number of software threads. The memory is a constant without the extension for larger PARAMs and is proportional to the number of CPUs with the extension. This method converts a lock-free algorithm to wait-free at a cost which grows at a rate lesser than the number of software threads, without any degradation in performance. This enables a specific partitioning and interfacing between software and hardware which are designed to eliminate atomicity violations.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:
1. A method comprising:
executing a plurality of software threads by a plurality of processing units, said plurality of software threads is associated with at least one operation of a lock free algorithm, wherein said lock free algorithm is converted to a wait free algorithm, wherein said plurality of processing units being communicatively associated with a hardware accelerator, wherein said at least one operation is conveyed to said hardware accelerator via a read operation or a write operation by encoding said at least one operation in an address of a read request or a write request;

generating at least one said read request or said write request at said hardware accelerator based on said execution;

generating at least one said operation comprising a parameter and said read request or write request at said hardware accelerator, wherein said hardware accelerator is associated with a plurality of buses, and wherein said hardware accelerator is accessible to said plurality of software threads associated with said plurality of processing units as a memory mapped device mapped into a pre-determined physical address range of each of said plurality of buses for ensuring contention resolution among said plurality of buses;

checking, an operation specific condition of at least one software thread of said plurality of software threads, wherein said operation specific condition comprises an operation success or an operation failure based on said parameter and at least one of said read request, or said write request; and updating, at least one of read value or write value and at least one state variable upon said operation specific condition being an operation success.

2. The method of claim 1, further comprises performing prior to checking said operation specific conditions:

encoding said at least one operation, and a device address associated with said read request to obtain an encoded data, wherein said encoded data is communicated to said hardware accelerator by said plurality of software threads executed by said plurality of processing units, and returning at least one of a failure value or a success value of said at least one operation from said hardware accelerator to said plurality of software threads on a plurality of data lines associated with said pre-determined physical address range, wherein said hardware accelerator returns said at least one of said failure value or said success value without any external dependency and is thus wait-free, wherein said lock free algorithm is partitioned into said software and said hardware wherein said encoded data is passed from said software to said hardware and obtaining return encoded data from said hardware.

3. The method of claim 1, further comprises performing prior to checking said operation specific conditions:

encoding said at least one of operation, (b) said parameter, (c) said device address, and (d) plurality of data lines associated with said write request to obtain an encoded data, wherein said encoded data is communicated to said hardware accelerator by said plurality of software threads executed by said plurality of processing units, wherein said lock-free algorithm is partitioned into said software and said hardware, wherein said encoded data is passed from said software to said hardware.

4. The method of claim 1, wherein a contention within each of said plurality of buses is resolved through one of an arbitration protocol and a starvation free priority resolution technique.

5. The method of claim 3, wherein said at least one of operations and said parameter is encoded in said plurality of software thread as a least significant bit of said encoded data and passed on to said hardware accelerator for partitioning said lock-free algorithm into software and hardware.

6. The method of claim 1, wherein said steps of checking operation specific condition and updating are performed by said hardware accelerator.

7. The method of claim 2, wherein said steps of encoding and returning are performed by said hardware accelerator.

8. The method of claim 1, wherein said pre-determined physical address range associated with each of said plurality of buses is associated with at least one processing unit of said plurality of processing units.

9. The method of claim 3, further comprises encoding said at least one of operation, said device address and a memory address location of said parameter for generating said encoded data, upon size of said parameter exceeding a pre-allocated number of bits for said parameter in said encoded data, and wherein said memory address location corresponds to a pre-allocated memory for said parameter.

10. The method of claim 9, wherein said pre-allocated memory is allocated proportional to a number of concurrent requests during execution of said plurality of software threads by said hardware accelerator at any predetermined instance of time.

11. The method of claim 9, further comprises:
(a) masking at least one interrupt on a processing unit from among said plurality of processing units being accessed by said hardware accelerator;
(b) writing into said pre-allocated memory for said parameter reserved for said processing unit;
(c) performing a read or write operation to said hardware accelerator and passing said pre-allocated memory as parameter for said encoding; and
(d) unmasking said masked interrupt.

12. The method of claim 9, further comprises, allocating said pre-allocated memory for said parameter based on a circular queue comprising:

reading a dedicated hardware accelerator to obtain a pre-allocated memory for said parameter, wherein said dedicated hardware accelerator is dedicated for parameter memory allocation;

writing into said pre-allocated memory for said parameter reserved for said processing unit;

performing, a read or write operation to said dedicated hardware accelerator and passing said pre-allocated memory as parameter; and writing said pre-allocated memory into said dedicated hardware accelerator to release said pre-allocated memory.

13. A hardware accelerator comprising a dedicated digital logical circuit and memory storing at least one VALUE and at least one STATE, wherein said dedicated digital logical circuit is configured to:

process at least one of a read request or a write request at a hardware accelerator upon execution of a plurality of software threads by a plurality of processing units, said plurality of software threads is associated with at least one operation of a lock free algorithm, wherein said lock free algorithm is converted to a wait free algorithm, wherein said at least one operation is conveyed to said hardware accelerator via a read operation or write operation by encoding said at least one operation in an address of a read request or a write request;

process at least one operation comprising a parameter and said read request or write request at said hardware accelerator, wherein said hardware accelerator is associated with a plurality of buses, and wherein said hardware accelerator is accessible to said plurality of software threads associated with said plurality of processing units as a memory mapped device mapped into a pre-determined physical address range of each of said plurality of buses for ensuring contention resolution among said plurality of buses;

check an operation specific condition of at least one software thread of said plurality of software threads, wherein said operation specific condition comprises an operation success or an operation failure based on said parameter and at least one of said read request, or said write request; and update at least one of: at least one read VALUE or write VALUE and at least one STATE variable upon said operation specific condition being an operation success.

14. The hardware accelerator of claim 13, further configured to, perform prior to checking said operation specific conditions:

decode said at least one operation, and a device address associated with said read request to obtain an encoded data, wherein said encoded data is communicated to said hardware accelerator by said plurality of software threads executed by said plurality of processing units, and return at least one of a failure value or a success value of said at least one operation from said hardware accelerator to said plurality of software threads on a plurality of data lines associated with said pre-determined physical address range, wherein said hardware accelerator returns at least one of said failure value or said success value without any external dependency and is thus wait-free, wherein said lock free algorithm is partitioned into said software and said hardware, wherein said encoded data is passed from said software to said hardware and obtaining return encoded data from said hardware.

15. The hardware accelerator of claim 13, further configured to, perform prior to checking said operation specific conditions:

decode (a) said at least one of operation, (b) said parameter, (c) said device address, and (d) plurality of data lines associated with said write request to obtain an encoded data, wherein said encoded data is communicated to said hardware accelerator by said plurality of software threads executed by said plurality of processing units, wherein said lock-free algorithm is partitioned into said software and said hardware, wherein decoded data is passed from said software to said hardware.

16. The hardware accelerator of claim 13, wherein a contention within each of said plurality of buses is resolved through one of an arbitration protocol and a starvation free priority resolution technique.

17. The hardware accelerator of claim 15, wherein said at least one of operation and said parameter is encoded in said plurality of software thread as a least significant bit of said encoded data and passed on to said hardware accelerator for partitioning said lock-free algorithm into software and hardware.

18. The hardware accelerator of claim 13, wherein said pre-determined physical address range associated with each of said plurality of buses is associated with at least one processing unit of said plurality of processing units.

19. The hardware accelerator of claim 15, further configured to, decode said at least one of operation, said device address and a memory address location of said parameter for generating said encoded data, upon size of said parameter exceeding a pre-allocated number of bits for said parameter in said encoded data, and wherein said memory address location corresponds to a pre-allocated memory for said parameter.

20. The hardware accelerator of claim 19, further configured to upon receiving a read or write operation to said hardware accelerator passing said pre-allocated memory as parameter for said encoding, performs a read operation for retrieving said pre-allocated memory and use its contents as parameter for the requested operation.

21. The hardware accelerator of claim 19, further configure to allocate said pre-allocated memory for said parameter based on a circular queue comprising:

read a dedicated hardware accelerator to allocate a pre-allocated memory for said parameter, wherein said dedicated hardware accelerator is dedicated for parameter memory allocation, write said pre-allocated memory into said dedicated hardware accelerator to release said pre-allocated memory.

22. A hardware accelerator comprising a processor and a memory storing instructions to execute on said processor, wherein said memory storing at least one VALUE and at least one STATE, wherein said processor is configured to:

process at least one of a read request or a write request at a hardware accelerator upon execution of a plurality of software threads by a plurality of processing units, said plurality of software threads is associated with at least one operation of a lock free algorithm, wherein said lock free algorithm is converted to a wait free algorithm, wherein said at least one operation is conveyed to said hardware accelerator via a read operation or a write operation by encoding said at least one operation in an address of a read request or a write request;

process at least one operation comprising a parameter and said read request or write request at said hardware accelerator, wherein said hardware accelerator is associated with a plurality of buses, and wherein said hardware accelerator is accessible to said plurality of software threads associated with said plurality of processing units as a memory mapped device mapped into a pre-determined physical address range of each of said plurality of buses for ensuring contention resolution among said plurality of buses;

check an operation specific condition of at least one software thread of said plurality of software threads, wherein said operation specific condition comprises an operation success or an operation failure based on said parameter and at least one of read request, or said write request; and update at least one of read VALUE, write VALUE or at least one STATE variable upon said operation specific condition being an operation success.

* * * * *